No. 613,899. Patented Nov. 8, 1898.
E. C. ELDREDGE.
INSTRUMENT FOR MEASURING ELECTRIC CURRENTS.
(Application filed June 20, 1898.)
(No Model.)
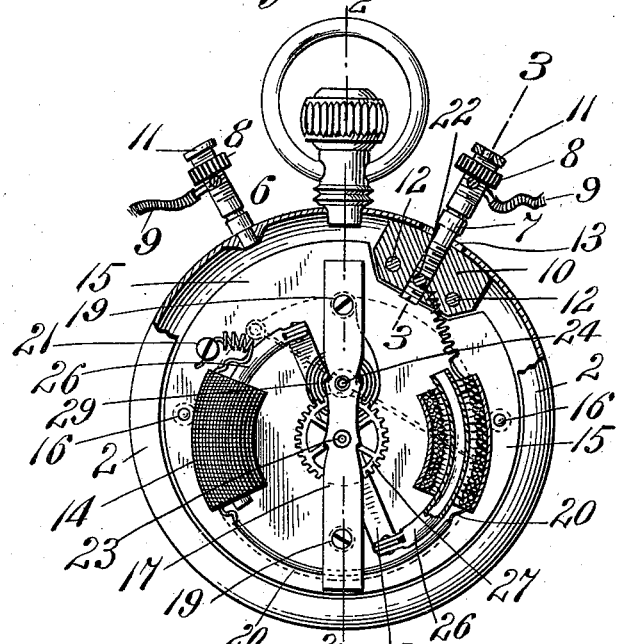
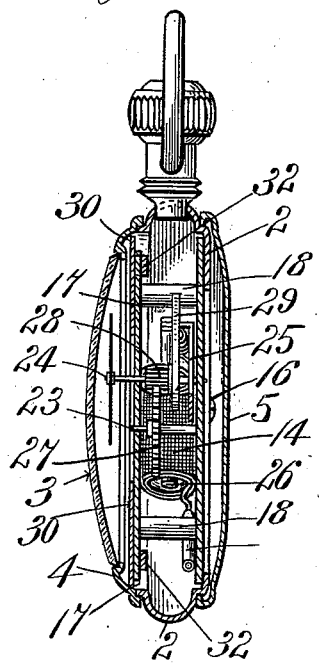
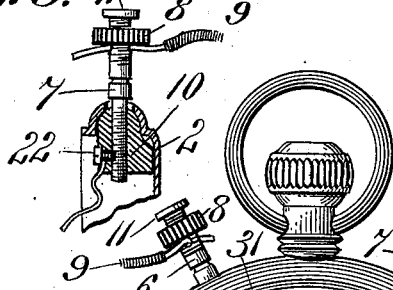
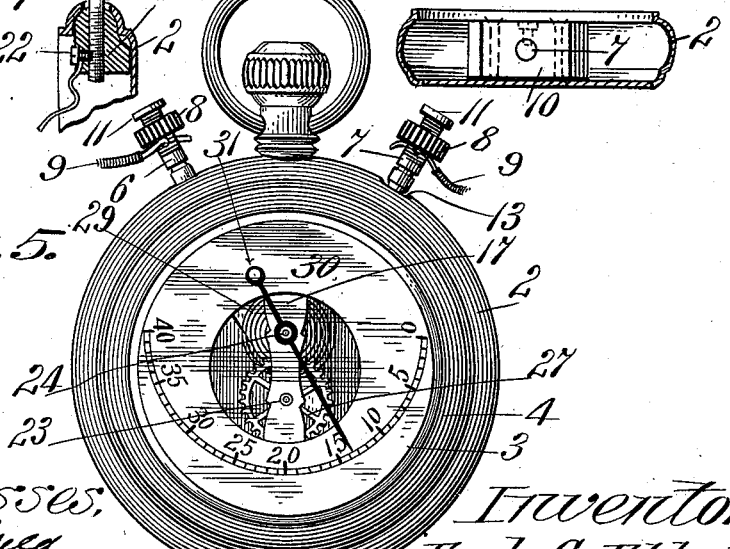
Witnesses:
J. D. Gayfield
H. D. Clemons
Inventor,
Earl C. Eldredge,
by Chapin & Co.
Attorneys.
THE NORRIS PETERS CO., PHOTO-LITHO., WASHINGTON, D. C.

UNITED STATES PATENT OFFICE.

EARL C. ELDREDGE, OF SPRINGFIELD, MASSACHUSETTS.

INSTRUMENT FOR MEASURING ELECTRIC CURRENTS.

SPECIFICATION forming part of Letters Patent No. 613,899, dated November 8, 1898.

Application filed June 20, 1898. Serial No. 683,950. (No model.)

*To all whom it may concern:*

Be it known that I, EARL C. ELDREDGE, a citizen of the United States of America, residing at Springfield, in the county of Hampden and State of Massachusetts, have invented new and useful Improvements in Instruments for Measuring Electric Currents, of which the following is a specification.

This invention relates to instruments for measuring electric currents, the object being to provide a simple and portable pocket instrument for said purpose, the same being especially constructed for testing primary batteries, but is equally applicable for testing currents of greater force and quantity; and the invention consists in the peculiar construction and arrangement of the various parts of the instrument, all as hereinafter fully described, and more particularly pointed out in the claims.

This instrument possesses the advantages of a conveniently-portable form to be carried in the pocket of a garment, and is one embodying a positive or simple form of contact or binding-post so constructed as to prevent the loss of any parts of the same during use and one avoiding the presence therein of an inconvenient quantity of iron or other magnetic metal in its fields, thus avoiding an excessive amount of residual magnetism, thereby rendering the indicating action of the instrument more uniform; also the combination of two solenoidal coils (instead of one) electrically connected, and a twofold armature, pivotally mounted and equally balanced, provides for avoiding all extra counterbalances or weights. Furthermore, the location of the tension or hand-returning spring with suitable means for changing its tension above the armature and where the polarity is neutral causes said spring to be fully operative at all times.

In the drawings forming part of this specification, in which the parts are shown much enlarged, Figure 1 is a front face view of the measuring instrument with the dial and the indicating-hand removed, showing the case and certain parts in section. Fig. 2 is a transverse section on line 2 2, Fig. 1, of the case and certain of the devices therein, as below described, other parts being there shown in side and other views. Fig. 3 is taken partly on line 3 3, Fig. 1; and Fig. 4 illustrates detail parts, all of which are below described. Fig. 5 is a front side elevation of the instrument, the position of the indicating-hand there shown relative to the dial being such as would result from connecting the instrument in an energized electrical circuit.

In the drawings, 2 indicates the case of the instrument, which in general is much like that of an ordinary watch, and is thereby adapted to be conveniently carried in the pocket. Said case has a crystal front 3, attached to a holding-ring 4, and said ring springs onto said case in the usual way, as with watch-case parts. The back 5 of the case likewise springs onto said case, and consequently said crystal and back may be easily removed and access be had to the contained mechanism of the instrument for adjusting or removing the same from the case. Two binding-posts 6 and 7, each having a transverse perforation to receive the end of a wire and a head 11 thereon for retaining the below-named nuts thereon, are provided for said case and each provided with a nut 8 (which is not removable from the post) for temporarily securing the ends of conducting-wires 9 thereto, as shown, by screwing against said wire. One of said posts—viz., 6—is firmly and electrically attached to said case, while said post 7 is firmly secured in a block 10, of suitable insulating material, which is firmly secured to said case by screws or pins 12. Said post 7 passes through an opening 13 in the border of the case 2 and is therefore wholly insulated from the latter. The coils 14 employed in this construction are of the solenoidal type, of curved form, as shown, each being covered with a suitable insulating material and suitably secured to the plate 15, upon which other operating parts below mentioned are mounted. Said last-named plate is secured in the inside of said case 2 by screws 16, Figs. 1 and 2. Said two coils are electrically connected by the insulated conductor 20, and the opposite ends of the coils thereof are connected, one with the said plate 15 by a screw 21 and, through said last-named plate, with the case 2, and the said binding-post 6 and the second coil being connected, as shown, with said insulated post 7 by means of a screw 22, which contacts with said post. (See Figs. 1 and 3.) A bar 17, serving a purpose below described, is supported on two posts 18, which are fixed by one end on said plate 15, and two screws 19 serve to hold said bar firmly on said posts. Two shafts 23 and 24 are pivoted between said bar 17 and the plate 15 for free reciprocating rotary motions. To said shaft 23 is fixed the armature-carrying lever 25, on each extremity of which is a curved armature 26, each arranged to move within one of said coils 14. On said shaft 23 is fixed a gear 27, which engages a pinion 28 on said shaft 24. Said armatures are made tubular, as shown, as in that form they become more quickly demagnetized after the instrument has been in use. A coiled spring 29 has one end adjustably attached to said bar 17 and its opposite end to said shaft 24 and acts, through said gear connection, to swing said lever 25, and thus withdraw said armatures from said coils, when electric action upon the instrument shall cease or be cut off. Said shaft 24, as shown in Figs. 2 and 5, projects above the surface of the dial-plate 30 of the instrument and carries the hand 31 thereon. The normal position of said hand is at zero on the dial. On the under side of the dial 30, near the upper and lower edges thereof, are fixed two cross-straps 32, (see Fig. 2,) between which and the adjoining side of the dial the extremities of said bar 17 are entered by moving the dial over the latter, and thereby the dial is attached to the case in a manner which renders its removal for cleaning or adjusting the instrument very convenient. The opening in the center of the dial provides for thus removing and replacing it without disturbing the indicating-hand 31.

In the use of the within-described instrument for ascertaining the energy of a current in an electric circuit the instrument is connected in the line, as indicated in Fig. 1, the connection ordinarily being first made with the binding-post 6, and finally with the post 7, thereby bringing the said two coils into the circuit and producing the answering action of the lever 25, the armatures 26, and through the described gear connection between the shaft 23, supporting said lever, and the hand-carrying shaft 24, causing the hand 31 to swing and indicate the degree of electric energy on the conducting-wire on the dial of the instrument.

Of the above-referred-to parts of the instrument all excepting the coils 14 and their connections, including those indicated by 26 and their wire connections with the case 2 by the screw 21 and with the binding-post 7, are of metal, as brass or brass silver-plated, of non-magnetic quality.

Having thus described my invention, what I claim, and desire to secure by Letters Patent, is—

1. In a pocket instrument for measuring electric currents, a circular metal case, two solenoidal coils having curved cores, tubular armatures therefor having the same radius as said cores, a bar, to the opposite ends of which said armatures are fixed, pivotally supported in said case centrally relative to said coils, a pivot-staff for said bar, a gear-wheel on said staff, a second pivot-staff, a pinion thereon in mesh with said gear-wheel, a helically-coiled spring secured by one end on said second staff, and by its opposite end to said case, whereby backlash between said gear and pinion is prevented, and means for regulating the tension of said spring; two binding-posts, one connected with, and the other insulated from, said case, metallic connection between said coils, and a metallic connection between one of said coils and said case and between the other said coil and said insulated binding-post, substantially as described.

2. In an instrument of the class described, a case having two binding-posts thereon, one in electric connection therewith and one insulated therefrom, each of said posts having a transverse perforation near its outer extremity to receive the end of a wire, and each having a non-removable wire-binding nut thereon, substantially as described.

3. In an instrument of the class described, means for attaching the dial temporarily thereto comprising a bar 17, supported thereon, combined with the dial having cross-straps on the under side thereof for a sliding engagement with the ends of said bar, substantially as described.

EARL C. ELDREDGE.

Witnesses:
H. A. CHAPIN,
WM. H. CHAPIN.